United States Patent
Hendriks et al.

(10) Patent No.: US 6,665,132 B2
(45) Date of Patent: Dec. 16, 2003

(54) OPTICAL LENS SYSTEM COMPRISING AT LEAST ONE LENS OF A SYNTHETIC MATERIAL

(75) Inventors: Bernardus Hendrikus Wilhelmus Hendriks, Eindhoven (NL); Fransiscus Christiaan Van Dorst, Eindhoven (NL); Fransiscus Marinus Andrea Maria Van Gaal, Eindhoven (NL); Cornelius Antonius Nicolaas Maria Van Der Vleuten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/122,745

(22) Filed: Apr. 15, 2002

(65) Prior Publication Data

US 2002/0181127 A1 Dec. 5, 2002

(30) Foreign Application Priority Data

Apr. 25, 2001 (EP) ............................................. 01201489
May 25, 2001 (EP) ............................................. 01201965

(51) Int. Cl.[7] .......................... G02B 7/02; G03B 17/26; G03B 21/14; F21V 17/00
(52) U.S. Cl. ....................... 359/819; 359/820; 396/526; 362/455; 353/100
(58) Field of Search ............................... 359/819, 664, 359/696, 703, 741, 796, 806, 809, 813, 811, 820, 365; 396/526; 362/455; 353/100

(56) References Cited

U.S. PATENT DOCUMENTS

| 3,205,774 A | | 9/1965 | Estes .............................. 88/57 |
| 4,422,169 A | * | 12/1983 | Vitale et al. .............. 369/44.22 |
| 5,612,826 A | * | 3/1997 | Ohshita ....................... 359/819 |
| 6,108,292 A | * | 8/2000 | Zijp ....................... 369/112.24 |
| 6,270,696 B1 | * | 8/2001 | Jain et al. ..................... 264/1.1 |

FOREIGN PATENT DOCUMENTS

| EP | 0826997 A2 | 4/1998 | ............ G02B/6/42 |
| EP | 0863502 A2 | 9/1998 | ............ G11B/7/135 |

OTHER PUBLICATIONS

Patent Abstracts of Japan, Hirota shinichiro, "Method Of Manufacturing Slider For Optical Pickup And Slider For (List continued on next page.)

Primary Examiner—Hung Xuan Dang
Assistant Examiner—Joseph P Martinez
(74) Attorney, Agent, or Firm—Michael E. Belk

(57) ABSTRACT

The invention relates to an optical lens system (39) which is suitable for use in an optical scanning device (15) for reading and/or writing an optically scannable record carrier (9). The lens system comprises a first lens or objective lens (45) and a second lens or auxiliary lens (47) which is small in comparison with the first lens and which, in operation, is positioned between the first lens and the record carrier. The lenses are arranged in a lens holder (61).

Figure 1:
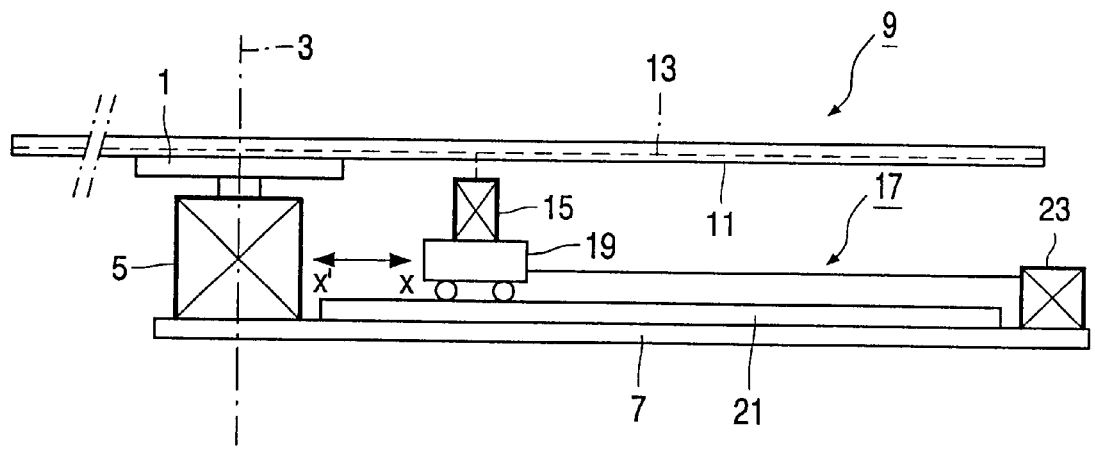

According to the invention, the lens holder (61) and one of the two lenses (45, 47) are manufactured as one integrated part (63) from a transparent synthetic material by means of a moulding process, and the other lens is arranged in the integrated part as a separate component, with a chamber (85) enclosed by the lens holder and the two lenses communicating with the environment of the lens system via an air vent connection (93). The lens system thus comprises only two parts to be assembled, so that the assembling process is considerably simplified. The air vent connection prevents the occurrence of overpressure in the chamber that might result from a temperature increase of the lens system and cause unwanted mechanical deformations of the integrated part.

In a preferred embodiment, the integrated part (63) comprises the second lens or auxiliary lens (47), and the air vent connection comprises at least one groove-like channel (93), which is formed in a surface of a lens-holding portion (69) provided in the integrated part for holding the objective lens (45).

13 Claims, 4 Drawing Sheets

OTHER PUBLICATIONS

Optical Pickup Ad Well As Optical Pickup Device," Publication No. 2002056571, Feb. 22, 2002, Application No. 2000244437, Nov. 8, 2000.

Patent Abstracts of Japan, Karasawa Tadao, "Optical Head," Publication No. 62036751, Feb. 17, 1987, Application No. 60174319, Sep. 8, 1985.

Patent Abstracts of Japan, Owa Hideo, "Objective Lens And Its Manufacturer," Publication No. 2000131508, Dec. 5, 2000 Application No. 10304308, Oct. 26, 1998.

* cited by examiner

OPTICAL LENS SYSTEM COMPRISING AT LEAST ONE LENS OF A SYNTHETIC MATERIAL

The invention relates to an optical lens system for use in an optical scanning device for scanning an optically scannable record carrier, which lens system comprises a first lens, a second lens, which is relatively small in comparison with the first lens and, in operation, is positioned between the first lens and the record carrier, and a lens holder accommodating the two lenses.

The invention also relates to an optical scanning device for scanning an optically scannable record carrier, which scanning device comprises a radiation source, an optical lens system having an optical axis for focusing a radiation beam supplied, in operation, by the radiation source to a scanning spot on the record carrier, and an actuator for displacing the lens system parallel to the optical axis, the lens system comprising a first lens, a second lens, which is relatively small in comparison with the first lens and, in operation, is positioned between the first lens and the record carrier, and a lens holder accommodating the two lenses.

The invention also relates to an optical player comprising a table which is rotatable about an axis of rotation, a displacement device and an optical scanning device for scanning an optically scannable record carrier which can be placed on the table, the scanning device comprising a radiation source, an optical lens system having an optical axis for focusing a radiation beam supplied, in operation, by the radiation source to a scanning spot on the record carrier, and an actuator for displacing the lens system parallel to the optical axis, the lens system comprising a first lens, a second lens, which is relatively small in comparison with the first lens and, in operation, is positioned between the first lens and the record carrier, and a lens holder accommodating the two lenses, at least the lens system of the scanning device being displaceable by means of the displacement device substantially in a radial direction relative to the axis of rotation.

An optical lens system, an optical scanning device, and an optical player of the types referred to in the opening paragraphs are known from EP-A-0 863 502. The first lens of the known lens system is a main lens or objective lens, whilst the second lens is a relatively small auxiliary lens which, in operation, is positioned between the main lens and the record carrier to be scanned. By using the auxiliary lens, the known lens system has a relatively large numerical aperture. As a result, the radiation beam, which, in operation, is generated by the radiation source of the known optical scanning device in which the known optical lens system is used, is focused by the lens system to a relatively small scanning spot on the record carrier. The known scanning device and the known optical player, in which the known scanning device is used, are thus suitable for scanning record carriers having relatively small elementary information characteristics, i.e. record carriers having a relatively high information density. The known scanning device and the known optical player are therefore particularly suitable for scanning record carriers in accordance with the so-termed DVR-system. The two lenses of the known optical system are made of glass. Upon manufacture of the optical lens system, the two lenses are separately arranged in the lens holder. In order to obtain an adequate optical accuracy of the lens system, the optical axes of the two lenses must coincide within predetermined, relatively close tolerances. In order to obtain such accurate positions of the lenses in the lens holder, the two lenses must be aligned relative to each other by means of suitable aligning tools during assembly of the lens system.

One drawback of the known lens system, the known optical scanning device and the known optical player is that the assembly of the lens system is relatively complicated, because the lens system comprises at least three separate parts, i.e. the lens holder and the two lenses, each of which needs to be produced separately first, and because the two lenses must be aligned relative to each other.

It is an object of the invention to provide an optical lens system, an optical scanning device and an optical player of the types referred to in the opening paragraphs, in which the lens system can be manufactured in a considerably simplified manner, whilst the lens system has an optical accuracy which, also in operation, is at least as high as the optical accuracy of the known lens system.

In order to achieve this object, an optical lens system according to the invention is characterized in that the lens holder and one of the two lenses are manufactured as one single integrated part from a transparent synthetic material by means of a moulding process, whilst the other lens is arranged in the integrated part as a separate component, with a chamber enclosed by the two lenses and the lens holder communicating with the environment of the lens system via an air vent connection.

In order to achieve this object, an optical scanning device according to the invention is characterized in that the lens system used therein is an optical lens system according to the invention.

In order to achieve this object, an optical player according to the invention is characterized in that the optical scanning device used therein is an optical scanning device according to the invention.

Since the lens holder and one of the two lenses are manufactured as one single integrated part from a transparent synthetic material by means of a moulding process, with the other lens being arranged as a separate component in the integrated part, only two parts need to be mutually assembled during assembly of the lens system according to the invention. The integrated part can be manufactured in a very accurate manner by means of the moulding process. The integrated part may be provided, for example, with a lens mount and/or a positioning surface for the other lens being accurately positioned with respect to the integrated lens, so that the other lens can be accurately positioned with respect to the integrated lens in the integrated part in a very simple manner. This leads to a considerable simplification of the assembly of the lens system according to the invention and obviates the need to align the lenses relative to each other. Since the chamber enclosed by the two lenses and the lens holder communicates with the environment of the lens system via an air vent connection, an increase of the air pressure in the aforesaid chamber is prevented in operation. Without the use of the air vent connection, such an increase of the air pressure would result from an increase of the ambient temperature of the lens system. Since the integrated lens of synthetic material is considerably less stiff than a lens which is made of glass, such an increase of the air pressure would lead to deformations of the integrated lens, which in turn would lead to an unacceptable decrease of the optical accuracy of the lens system. Since such deformations of the integrated lens are prevented in this manner, the lens system according to the invention has an optical accuracy which, also in operation, is at least as high as the optical accuracy of a lens system which only comprises glass lenses. Another advantage of the lens system according to the invention is the fact that the lens system has a relatively low mass, due to the use of the lens of synthetic material. In a special embodiment of the lens system according to the invention, said mass is further reduced by making the other lens of synthetic material as well. This leads to a considerable reduction of the forces required for displacing the lens system, as a result of which the scanning speeds of the scanning device and the player according to the invention can be considerably increased.

A special embodiment of an optical lens system according to the invention is characterized in that the integrated part comprises the lens holder and the second lens. Since the second lens is relatively small in comparison with the first lens, the second lens in itself would be more difficult to handle than the first lens during assembly of the lens system. Since the integrated part comprises the second lens in this special embodiment, the advantage of a simple assembly, which the invention offers in a general sense, is used optimally in this embodiment.

Another embodiment of an optical lens system according to the invention is characterized in that the integrated part is provided with a circular cylindrical lens mount for the other lens, which lens mount has a center line which substantially coincides with an optical axis of the lens that forms part of the integrated part, whilst the other lens makes up more than one half of a substantially spherical lens body of glass with a diameter which is substantially equal to a diameter of the lens mount. Since the diameter of the aforesaid spherical lens body is substantially equal to the diameter of the aforesaid circular cylindrical lens mount, the other lens is accurately positioned in the lens mount in directions perpendicular to the center line. Since the lens mount forms part of the integrated part, the lens mount can be arranged in the integrated part in a relatively simple and very accurate manner by means of the moulding process, so that the center line of the lens mount accurately coincides with the optical axis of the integrated lens. As a result, the other lens is accurately positioned relative to the integrated lens in directions perpendicular to the center line. Since the other lens makes up more than one half of the aforesaid spherical lens body, the other lens can still be tilted through limited angles about the center of the lens body after being placed in the lens mount without influencing the position of the other lens in directions perpendicular to the center line. As a result, the accurate position of the other lens relative to the integrated lens in directions perpendicular to the center line will not be affected when the other lens is tilted by means of suitable aligning tools after being placed in the lens mount for the purpose of aligning the optical axis of the other lens with the optical axis of the integrated lens. The spherical, glass lens body can be manufactured in a relatively simple, very accurate manner by means of, for example, a rolling process.

Yet another embodiment of an optical lens system according to the invention is characterized in that the integrated part is provided with a positioning surface for the other lens, which extends substantially perpendicularly to the center line and bounds the lens mount, whilst the spherical lens body of the other lens is provided with a boundary surface on a side facing the lens that forms part of the integrated part, via which boundary surface the other lens abuts against the positioning surface. Since said positioning surface forms part of the integrated part, the positioning surface can be arranged in the integrated part in a relatively simple and very accurate manner by means of the moulding process. The optical axis of the other lens extends perpendicularly to the aforesaid boundary surface of the spherical lens body. Since the other lens abuts with said boundary surface against the positioning surface, which has been accurately arranged perpendicularly to the center line and perpendicularly to the optical axis of the integrated lens by means of the moulding process, the optical axes of the two lenses of the lens system extend accurately parallel to each other after the other lens has been placed in abutment with the positioning surface, thus obviating the need to align the other lens.

A special embodiment of an optical lens system according to the invention is characterized in that the positioning surface adjoins the lens mount via a recess formed in the positioning surface. When the other lens is being placed in the circular cylindrical lens mount during assembly of the lens system, an outer circumference of the spherical lens body of the other lens is slid into the lens mount without play. As a result, dust particles that are present on the lens mount are carried along by the other lens and, owing to friction, particles are even detached from the lens mount. Since the aforesaid recess is formed at the location where the circular cylindrical lens mount joins the positioning surface, i.e. at the location where the other lens slides along the lens mount during assembly, substantially all the aforesaid dust particles and detached particles are collected in said recess. After the other lens has been placed in abutment with the positioning surface, said recess is closed by the boundary surface of the spherical lens body, so that the released particles are likewise confined.

Another embodiment of an optical lens system according to the invention is characterized in that the integrated part is provided with a lens mount for the other lens having the shape of a segment of a sphere, which lens mount has a center which lies on an optical axis of the lens that forms part of the integrated part, whilst the other lens comprises a lens body substantially having the shape of a segment of a sphere, which has a radius which is substantially equal to a radius of the lens mount. Since the lens mount having the shape of a segment of a sphere forms part of the integrated part, said lens mount can be arranged in the integrated part in a relatively simple and very accurate manner by means of the moulding process, so that the center of the lens mount is accurately positioned on the optical axis. Since the radius of the aforesaid lens body of the other lens having the shape of a segment of a sphere is substantially equal to the radius of the lens mount having the shape of a segment of a sphere, the other lens is accurately positioned in the lens mount in directions perpendicular to the optical axis of the integrated lens. After being placed in the lens mount, the other lens can still be tilted through limited angles about the center of the lens mount in said lens mount without influencing the position of the other lens in directions perpendicular to the optical axis of the integrated lens. As a result, the accurate position of the other lens relative to the integrated lens in directions perpendicular to the aforesaid optical axis will not be affected if the other lens is tilted by means of suitable aligning tools after being placed in the lens mount for the purpose of aligning the optical axis of the other lens with the optical axis of the integrated lens.

Yet another embodiment of an optical lens system according to the invention is characterized in that the air vent connection comprises at least one groove-like channel formed in a surface of the lens mount. Said channel is formed in the integrated part during the moulding process by providing the mould that is used in the moulding process with an elevation at the position of the channel. The air vent connection is thus provided in a very practical and simple manner.

A special embodiment of an optical lens system according to the invention is characterized in that the air vent connection comprises at least one groove-like channel formed in a surface of the lens mount and at least one groove-like channel formed in the positioning surface, which channels both open into the recess. In this special embodiment, in which the other lens abuts against the positioning surface with its boundary surface, the air vent connection is made up in a practical and efficient manner of the groove-like channel in the surface of the lens mount, the recess formed in the positioning surface and the groove-like channel in the positioning surface. In this embodiment, the air vent connection is likewise provided in the integrated part during the moulding process.

Another embodiment of an optical lens system according to the invention is characterized in that the integrated part is provided, near the lens that forms part of the integrated part, with a transparent window extending substantially perpendicularly to an optical axis of said lens, via which window the enclosed chamber is optically accessible from the environment of the lens system. Said window is formed in the integrated part in a simple manner during the moulding process by providing the mould used in the moulding process with an optically smooth surface at the position of the window. Via said window, the position of the boundary surface of the spherical lens body of the other lens can be measured in a practical manner by means of optical measuring equipment when the optical axis of the other lens is aligned with the optical axis of the integrated lens.

Yet another embodiment of an optical lens system according to the invention is characterized in that the integrated part is provided, near the lens that forms part of the integrated part, with a protective element which extends beyond the aforesaid lens, parallel to an optical axis of said lens. Said protective element protects the integrated lens in operation against unwanted contact with the record carrier and is provided in the integrated part in a simple manner during the moulding process by providing the mould used in the moulding process with a portion which is recessed relative to the integrated lens at the position of the protective element.

A special embodiment of an optical lens system according to the invention is characterized in that the lens that forms part of the integrated part is provided with a substantially circular optical boundary surface extending substantially perpendicularly to an optical axis of said lens, a center of which optical boundary surface is spaced apart from the optical axis by a distance which is larger than the radius of a radiation beam which, in operation, is present in the optical boundary surface. Said optical boundary surface is provided in the integrated part in a simple manner during the moulding process by providing the mould used in the moulding process with a circular, optically smooth surface at the position of the optical boundary surface. Such an optically smooth surface is formed in the mould by means of a precision lathe. As a result of this operation, an unavoidable irregularity is formed in the surface in the center of the optically smooth surface. Since said center is spaced apart from the optical axis by a distance which is larger than the radius of the radiation beam which, in operation, is present in the optical boundary surface, the presence of the irregularity in the optical boundary surface resulting from the aforesaid irregularity in the mould in the radiation beam in operation, which might cause an optical error of the integrated lens, is prevented in this special embodiment.

These and other aspects of the invention are apparent from and will be elucidated with reference to the embodiments described hereinafter.

Figure 2:
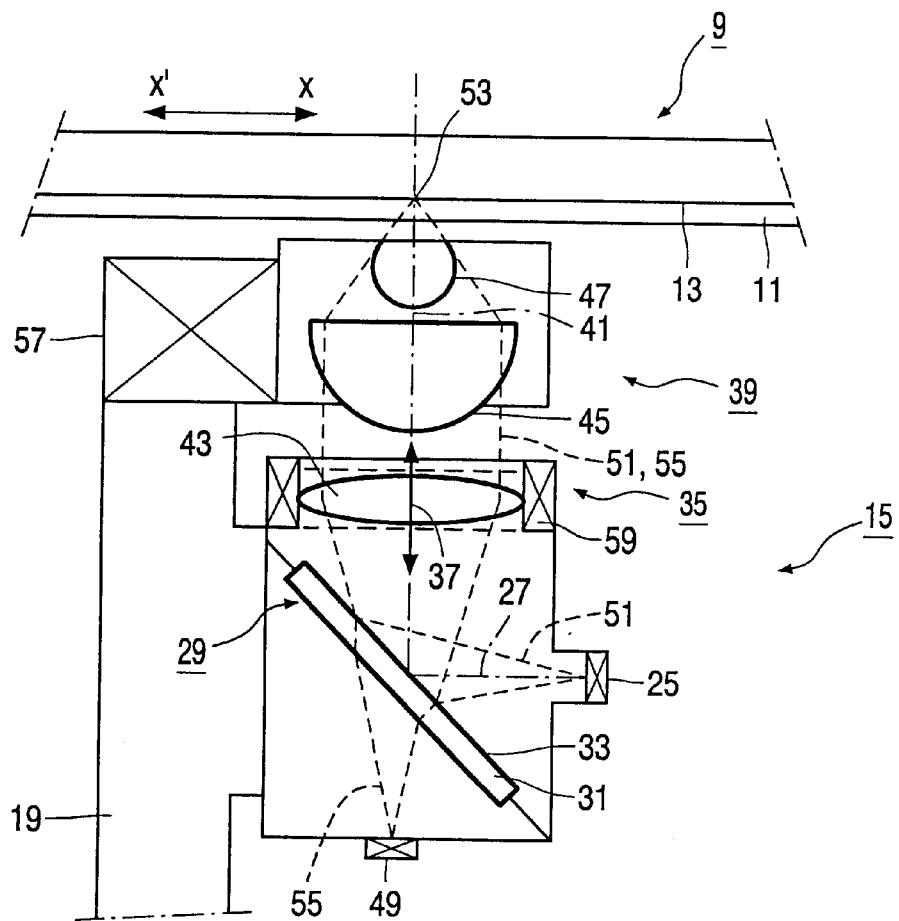
Figure 3A:
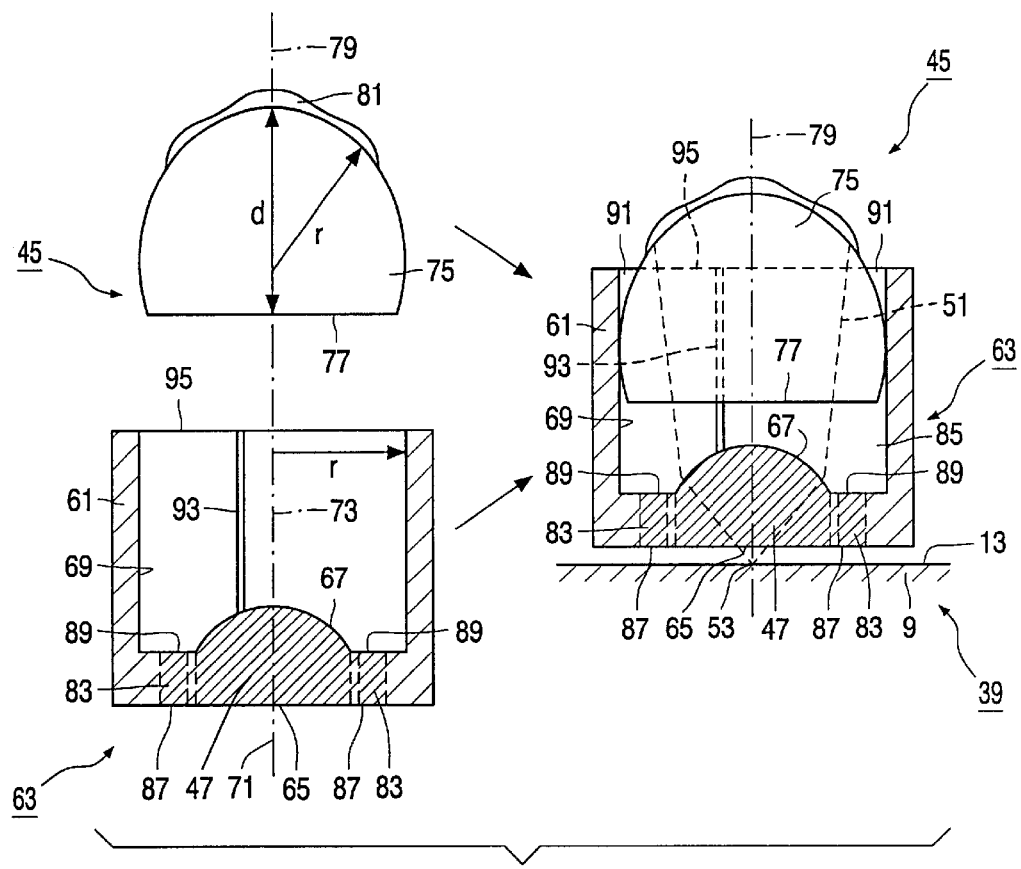
Figure 3B:
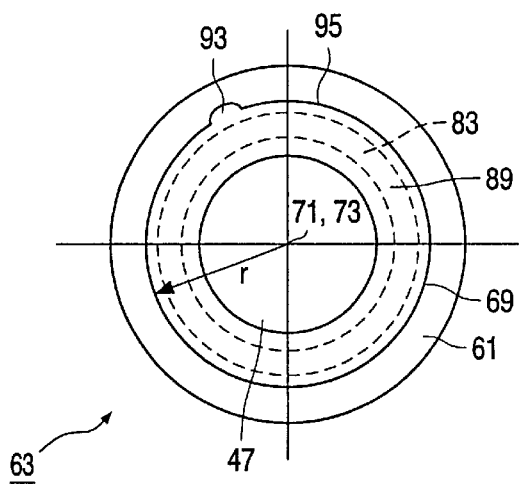
Figure 3C:
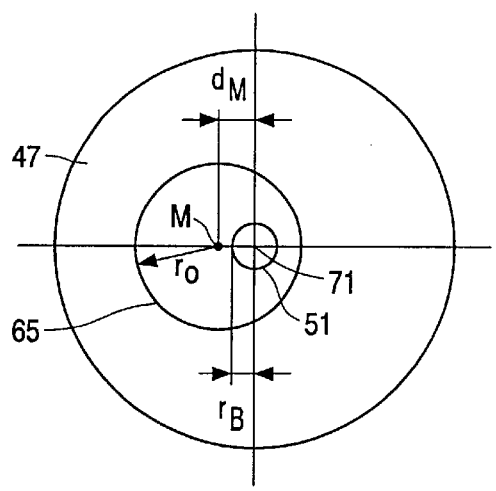
Figure 4A:
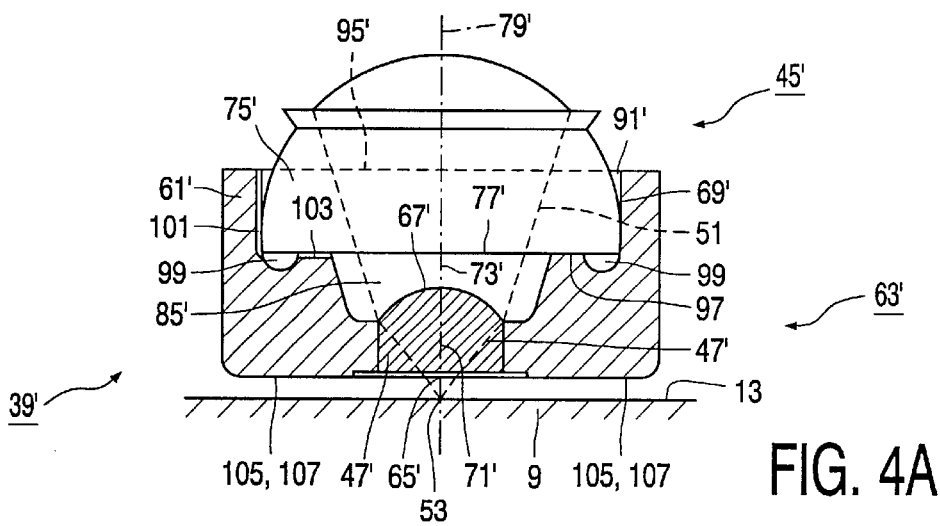
Figure 4B:
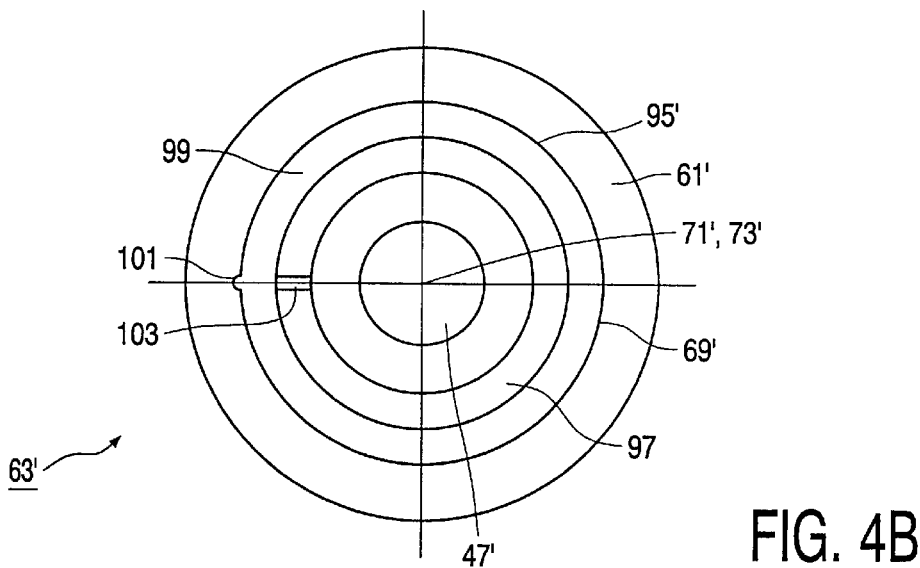
Figure 5:
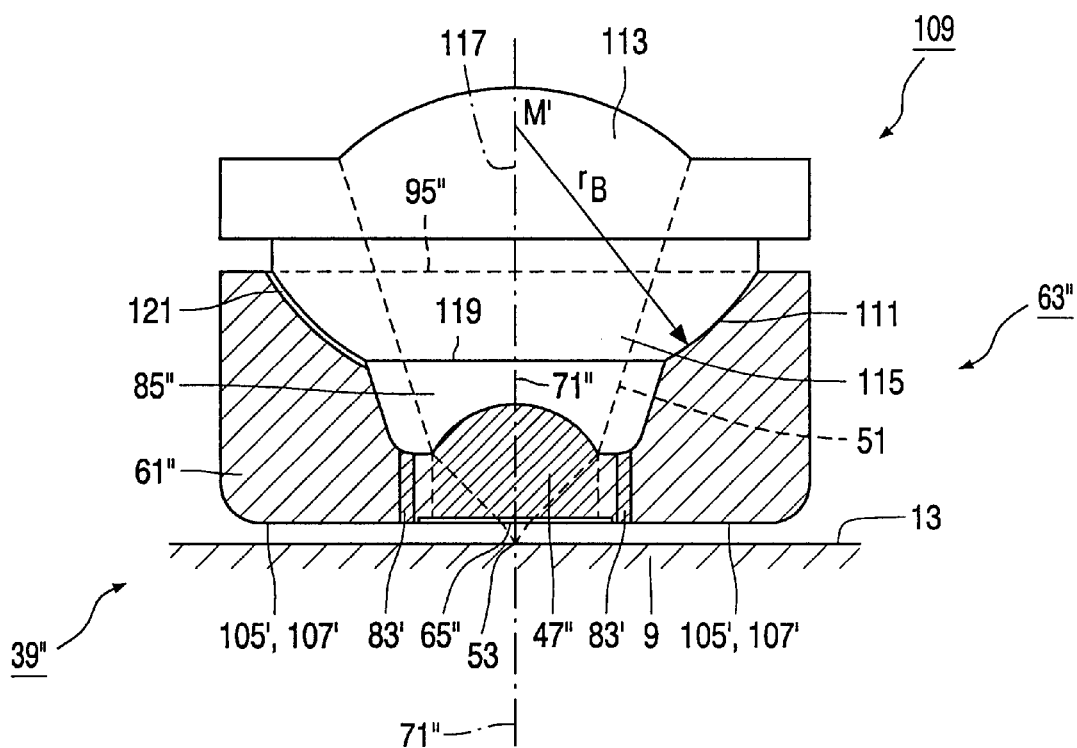

In the drawings,

FIG. 1 schematically shows an optical player according to the invention;

FIG. 2 schematically shows an optical scanning device according to the invention, which is used in the optical player shown in FIG. 1;

FIG. 3a schematically shows a first embodiment of an optical lens system according to the invention, which is used in the optical scanning device shown in FIG. 2;

FIG. 3b is a plan view of an integrated part of the optical lens system shown in FIG. 3a;

FIG. 3c schematically shows an optical boundary surface of an auxiliary lens of the optical lens system shown in FIG. 3a;

FIG. 4a schematically shows a second embodiment of an optical lens system according to the invention, which is suitable for use in the optical scanning device shown in FIG. 2;

FIG. 4b is a plan view of an integrated part of the optical lens system shown in FIG. 4a; and FIG. 5 schematically shows a third embodiment of an optical lens system according to the invention, which is suitable for use in the optical scanning device shown in FIG. 2.

The optical player according to the invention, which is schematically shown in FIG. 1, comprises a table 1 which is rotatable about an axis of rotation 3 and which can be driven by an electric motor 5 mounted on a frame 7. An optically scannable record carrier 9, such as a DVD, provided with a disc-shaped transparent substrate, on which an information layer 13 comprising a spirally extending information track is present, can be placed on the table 1. The information layer 13 is covered with a transparent protective coating 11. The optical player also includes an optical scanning device 15 according to the invention for optically scanning the information track on the record carrier 9. The scanning device 15 is movable mainly in two opposite radial directions X and X' relative to the axis of rotation 3 by means of a displacement device 17 of the optical player. To this end, the scanning device 15 is mounted on a slide 19 of the displacement device 17, which is further provided with a straight guide 21 mounted on the frame 7, which extends parallel to the X-direction, over which guide the slide 19 is movably guided, and an electric motor 23, by means of which the slide 19 can be moved over the guide 21. In operation, the motors 5 and 23 are controlled by an electrical control unit of the optical player (not shown) and as a result the record carrier 9 is rotated about the axis of rotation 3 whilst the scanning device 15 is simultaneously moved in a direction parallel to the X-direction, all this in such a manner that the spiral-shaped information track present on the record carrier 9 is scanned by the scanning device 15. During said scanning, the scanning device 15 can read the information present on the information track or write information onto the information track.

The optical scanning device 15 according to the invention which is used in the optical player according to the invention is schematically shown in FIG. 2. The scanning device 15 is provided with a radiation source 25, such as, for example, a semiconductor laser having an optical axis 27. The scanning device 15 also includes a radiation beam splitter 29, which includes a transparent plate 31 comprising a reflecting surface 33 facing towards the radiation source 25, which is disposed at an angle of 45° relative to the optical axis 27 of the radiation source 25. Furthermore, the scanning device 15 includes a collimator lens unit 35 having an optical axis 37 and an optical lens system 39 according to the invention having an optical axis 41, which collimator lens unit 35 is positioned between the radiation beam divider 29 and the lens system 39. In the illustrated embodiment, the collimator lens unit 35 includes a single collimator lens 43, whilst the lens system 39 includes a first lens or objective lens 45 and a second lens or auxiliary lens 47, which, in operation, is positioned between the objective lens 45 and the record carrier 9. In the illustrated embodiment, the optical axis 37 of the collimator lens unit 35 and the optical axis 41 of the lens system 39 coincide, enclosing an angle of 90° with the optical axis 27 of the radiation source 25. The scanning device 15 further includes an optical detector 49 of a conventional type which is known per se, which detector is disposed behind the radiation beam divider 29 relative to the collimator lens unit 35. In operation, the radiation source 25 generates a radiation beam 51, which is reflected by the reflecting surface 33 of the radiation beam divider 29 and is focused to a scanning spot 53 on the information layer 13 of the record carrier 9 by the lens system 39. The radiation beam 51 is reflected by the information layer 13 to a reflected radiation beam 55, which is focused onto the optical detector 49 via the lens system 39, the collimator lens unit 35 and the radiation beam divider 29. In order to read information present on the record carrier 9, the radiation source 25 generates a continuous radiation beam 51, with the optical detector 49 supplying a detection signal which corresponds to a series of successive elementary information characteristics on the information track of the record carrier 9 that are present in the scanning spot 53. In order to write information onto the record carrier 9, the radiation source 25 generates a radiation beam 51 which corresponds to the information to be written, with a series of successive elementary information characteristics being generated on the information track of the record carrier 9 in the scanning spot 53. It is noted that the invention also comprises optical scanning devices in which the radiation source 25, the collimator lens unit 35 and the lens system 39 are arranged in a different manner relative to each other. Thus, the invention comprises, for example, embodiments in which the optical axis 37 of the collimator lens unit 35 and the optical axis of 41 of the lens system 39 enclose an angle of 90° with each other, and in which an additional mirror is disposed between the collimator lens unit 35 and the lens system 39. In these embodiments, the optical scanning device has reduced dimensions, viewed in a direction parallel to the optical axis 41 of the lens system 39. The invention also comprises embodiments, for example, in which the radiation source 25 and the collimator lens unit 35 are not mounted on the slide 19, but are disposed in a fixed position relative to the frame 7, and in which the optical axis 37 of the collimator lens unit 35 extends parallel to the radial directions X, X'. In these embodiments, only the lens system 39 and an additional mirror are mounted on the slide 19, thus reducing the movable mass of the slide 19.

As FIG. 2 further shows, the optical scanning device 15 includes a first actuator 57 and a second actuator 59. The lens system 39 is movable over relatively small distances parallel to the optical axis 41 and parallel to the X-direction by means of the first actuator 57. By moving the lens system 39 parallel to the optical axis 41 by means of the first actuator 57, the scanning spot 53 is focused on the information layer 13 of the record carrier 9 with a desired accuracy. By moving the lens system 39 parallel to the X-direction by means of the first actuator 57, the scanning spot 53 will remain focused on the information track to be followed with a desired accuracy. To this end, the first actuator 57 is controlled by the aforesaid control unit of the optical player, which receives a focusing error signal as well as a tracking error signal from the optical detector 49. The collimator lens 43 of the collimator lens unit 35 is movable in a direction parallel to the optical axis 37 over relatively small distances by means of the second actuator 59. By moving the collimator lens 43 parallel to the optical axis 37 by means of the second actuator 59, spherical aberrations of the radiation beam 51 in the transparent protective coating 11 of the record carrier 9 are corrected. Such spherical aberrations are mainly caused by fluctuations in the thickness of the protective coating 11. To this end, the second actuator 59 is controlled by means of an electric control current by said control unit of the optical player, which receives an error signal from a sensor (not shown in the Figures), by means of which, for example, the thickness of the transparent protective coating 11 near the scanning spot 53 is measurable. The control unit is arranged to control the electric current through the second actuator 59 in such a manner that the collimator lens 43 can be disposed in a position in which said spherical aberration is corrected in a predetermined, conventional manner which is known per se.

FIG. 3a schematically shows a first embodiment of the aforesaid lens system 39. The second lens or auxiliary lens 47 which, in operation, is positioned between the first lens or objective lens 45 and the record carrier 9 to be scanned, is relatively small in comparison with the objective lens 45. By using the auxiliary lens 47, the lens system 39 has a relatively large numerical aperture, as a result of which the scanning spot 53, in which the radiation beam 51 is focused on the information layer 13, is relatively small. This renders the scanning device 15 suitable for scanning record carriers having a relatively high information density, in particular record carriers of the so-termed DVR system. The objective lens 45 and the auxiliary lens 47 are arranged in a lens holder 61, which is mounted on a movable part (not shown in FIG. 3a) of the actuator 57. The lens holder 61 and the auxiliary lens 47 are manufactured as one single integrated part 63 from a transparent synthetic material by means of a moulding process, and the objective lens 45 is provided in the integrated part 63 as a separate component. FIG. 3a also shows the integrated part 63 and the objective lens 45 as separate components prior to the assembly of the lens system 39. It is noted that the hatching used for the auxiliary lens 47 is different from that of the lens holder 61 in FIG. 3a, in spite of the fact that the auxiliary lens 47 and the lens holder 61 together form one single piece of transparent material. The different hatching, however, only indicates the optically effective portion of the integrated part 63 that forms the auxiliary lens 47. This optically effective portion is obtained by providing an optically smooth boundary surface 65 on a bottom side of the auxiliary lens 47 and an optically smooth lens surface 67 on an upper side of the auxiliary lens 47. Said boundary surface 65 and said lens surface 67 are obtained by providing optically smooth surfaces on corresponding parts of the mould used in the moulding process. In the illustrated embodiment, the lens holder 61 that forms part of the integrated part 63 is shaped like a sleeve and comprises a circular cylindrical lens mount 69 for the objective lens 45 on the inner side, which lens mount 69 has likewise been provided in the integrated part by means of the aforesaid moulding process. The integrated part 63 is formed in a very accurate manner by means of the aforesaid moulding process, so that an optical axis 71 of the auxiliary lens 47 and a center line 73 of the circular cylindrical lens mount 69 coincide within very close tolerances. In the illustrated embodiment, the objective lens 45 comprises more than one half of a substantially spherical lens body 75 of glass, a radius r of which equals a radius of the lens mount 69 within very close tolerances. The lens body 75 has an optically smooth boundary surface 77 on a side facing the auxiliary lens 47, and an optical axis 79 extending perpendicularly to the boundary surface 77. Since the lens body 75 is more than hemispherical, a dimension d of the lens body 75 in the direction of the optical axis 79, which is shown in FIG. 3*a*, is greater than the radius r. The lens body 75 has been coated with a transparent lacquer coating 81 on a side remote from the boundary surface 77, by means of a replica process which is known per se, with the thickness of said lacquer coating varying in such a manner that the objective lens 45 exhibits a predetermined, desired aspherical shape. The spherical lens body 75 of glass can be manufactured to exhibit a very accurate radius and roundness in a relatively simple manner, for example by means of a rolling process.

During assembly of the lens system 39, the objective lens 45 is mounted in the lens mount 69 of the integrated part 63. Since the integrated part 63 comprises the auxiliary lens 47 as well as the lens holder 61, only two components need to be fitted together during assembly of the lens system 39, so that it is relatively easy to assemble the lens system 39. As the auxiliary lens 47 is considerably smaller than the objective lens 45, the auxiliary lens 47 would be much more difficult to handle than the objective lens 45 if it were a separate component. Since the integrated part 63 comprises the auxiliary lens 47, the advantage of a simple assembly is optimally utilised. It is noted, however, that the invention also comprises embodiments in which the objective lens 45 and the lens holder 61 form an integrated part of a transparent synthetic material instead of the auxiliary lens 47, and in which the auxiliary lens 47 is arranged in the integrated part as a separate component. Since the radius r of the spherical lens body 75 of the objective lens 45 equals the radius of the circular cylindrical lens mount 69 within very close tolerances, the objective lens 45 is positioned in a very accurate manner in directions perpendicularly to the center line 73 of the lens mount 69 when it is being arranged in the lens mount 69. Since the center line 73 and the optical axis 71 of the auxiliary lens 47 coincide within very close tolerances, the objective lens 45 is positioned in a very accurate manner relative to be auxiliary lens 47 in directions perpendicular to the optical axis 71. After the objective lens 45 has been arranged in the lens mount 69, the objective lens 45 must be manipulated by means of an aligning tool into a position in which the optical axis 79 of the objective lens 45 extends parallel to the optical axis 71 of the auxiliary lens 47 within predetermined tolerances and in which the boundary surface 77 of the objective lens 45 is spaced apart from the auxiliary lens 47 by a predetermined distance within predetermined tolerances. To this end, the objective lens 45 is tilted about its center in the lens mount 69 and moved parallel to the center line 73 by means of the aforesaid aligning tool. Since the lens body 75 of the objective lens 45 is more than hemispherical, the objective lens 45 can be tilted through limited angles about its center in the lens mount 69 without influencing the position of the objective lens 45 in directions perpendicular to the center line 73, so that the accurate position of the objective lens 45 relative to the auxiliary lens 47 in said directions is not affected when the objective lens is tilted in the lens mount 69 by means of the aligning tool. While the objective lens 45 is being manipulated by means of the aligning tool, the position and the orientation of the boundary surface 77 of the objective lens 45 relative to the boundary surface 65 of the auxiliary lens 47 are measured by means of optical measuring equipment. To this end, the integrated part 63 includes a transparent window 83 extending substantially perpendicularly to the optical axis 71 of the auxiliary lens 47, via which window a chamber 85 enclosed by the objective lens 45, the auxiliary lens 47 and the lens holder 61 and bounded by the boundary surface 77 of the objective lens 45 is optically accessible from the environment of the lens system 39. As is shown in FIGS. 3*a* and 3*b*, the window 83 is annular in the illustrated embodiment and arranged near and around the auxiliary lens 47, so that the enclosed chamber 85 and the boundary surface 77 of the objective lens 45 are accessible to the aforesaid optical measuring equipment from a bottom side of the lens system 39. The transparent window 83 is obtained by providing optically smooth annular surfaces 87 and 89 in the lens holder 61 beside the auxiliary lens. Said surfaces 87 and 89 are formed in the integrated part 63 in a simple manner during the moulding process by providing the mould used in the moulding process with corresponding, optically smooth annular surfaces. It is noted that in FIG. 3*a* the hatching used for the window 83 is different from the hatching used for the lens holder 61 and the auxiliary lens 47, in spite of the fact that the lens holder 61, the auxiliary lens 47, and the window 83 together form one single piece of transparent material. However, this different hatching only indicates the optically effective part of the integrated part 63 that forms the window 83. After the objective lens 45 has thus been manipulated into the desired position in the lens mount 69 by means of the aligning tool, the objective lens 45 is fixed in position in the lens mount 69 by, for example, applying a small quantity of glue to a space 91 shown in FIG. 3*a*, which is present between the lens mount 69 and the objective lens 45.

After the assembly of the lens system 39, a quantity of air is present in the chamber 85 enclosed by the objective lens 45, the auxiliary lens 47 and the lens holder 61, which air is heated during operation of the optical player as a result of an increase of the ambient temperature of the lens system 39. Without additional measures, said heating of the air present in the chamber 85 would lead to an increase of the air pressure in the chamber 85. Such an increase of the air pressure could lead to mechanical deformations of the integrated part 63 formed of a synthetic material, which could result in an unacceptable decrease of the optical accuracy of the lens system 39. In order to prevent such an increase of the air pressure and deformation of the integrated part 63, the lens system 39 according to the invention is provided with an air vent connection, via which the chamber 85 communicates with the environment of the lens system 39. In the embodiment shown in FIGS. 3*a* and 3*b*, the air vent connection comprises a groove-like channel 93, which is formed in the surface of the circular cylindrical lens mount 69 and extends from the chamber 85 substantially parallel to the center line 73 towards an upper edge 95 of the lens mount 69. The channel 93 is formed in the integrated part 63 during the aforesaid moulding process in that the mould used in the moulding process is provided with a linear elevation on the part of the mould surface that corresponds to the lens mount 69, so that the air vent connection is obtained in a very practical and simple manner. Since the use of this air vent connection prevents the occurrence of the aforesaid mechanical deformations of the integrated part 63 in operation, the lens system 39 also exhibits an adequate optical accuracy in operation. It is noted that the air vent connection may also be formed in a different manner, for example by providing more than one groove-like channel in the lens mount 69 or an opening in a side wall of the lens holder 61. However, such an opening in the side wall is more difficult to form by means of a moulding process, or must be formed in the side wall afterwards.

FIG. 3*c* is a detailed view of the circular, optically smooth boundary surface 65 on the bottom side of the auxiliary lens 47. The boundary surface 65 only makes up a relatively small part of the bottom side of the auxiliary lens 47 because, as is shown in FIG. 3*a*, the radiation beam 51 is already strongly converged at the bottom side of the auxiliary lens 47. Said boundary surface 65 is obtained by providing a circular, optically smooth surface on a corresponding part of the mould used in the moulding process. Said circular, optically smooth surface is provided in the mould by means of a precision lathe, during which process an unavoidable and substantially uncorrectable surface irregularity is formed in the center of the aforesaid circular surface. This irregularity is encountered on the boundary surface 65 again in the form of an irregularity at the location of the center M of the boundary surface 65. As FIG. 3*c* shows, the boundary surface 65 is eccentrically arranged on the bottom side of the auxiliary lens 47, in such a manner that the center M is spaced apart from the optical axis 71 of the auxiliary lens 47 by a distance $d_M$ which is larger than the radius $r_B$ of the radiation beam 51 in the boundary surface 65 in operation. In this manner, the presence of the irregularity in the center M is prevented from recurring in the radiation beam 51 in operation, which would have an adverse effect on the optical accuracy of the lens system 39. The eccentrically arranged optical boundary surface 65 has a radius $r_O$ which is larger than $d_M + r_B$ so that the radiation beam 51 will be positioned entirely within the boundary surface 65.

FIGS. 4*a* and 4*b* schematically show a second embodiment of an optical lens system 39' according to the invention, which is suitable for use in the scanning device 15 instead of the lens system 39 as described above. In these Figures, parts of the lens system 39' that correspond to parts of the lens system 39 as described above are denoted by corresponding reference numerals. Hereinafter, only the essential differences between the lens system 39' and the lens system 39 will be discussed. In addition to the circular cylindrical lens mount 69', the integrated part 63' of the lens system 39' comprises a positioning surface 97 for the objective lens 45' which extends substantially perpendicularly to the center line 73' of the lens mount 69' and perpendicularly to the optical axis 71' of the auxiliary lens 47'. The positioning surface 97 is annular in the illustrated embodiment and is adjacent to the lens mount 69'. The positioning surface 97 is likewise formed in the integrated part 63' during the moulding process by providing the mould to be used in the moulding process with a corresponding mould surface. The positioning surface 97 is thus formed in the integrated part 63' in a simple and very accurate manner, as a result of which accurate values in particular of the squareness of the positioning surface 97 relative to the optical axis 71' of the auxiliary lens 47' and the position of the positioning surface 97, viewed in a direction parallel to the optical axis 71', will be obtained. During assembly of the lens system 39', the objective lens 45' is arranged in the lens mount 69' in such a manner that the boundary surface 77' of the objective lens 45' abuts against the positioning surface 97. As a result, the optical axis 79' of the objective lens 45' is moved into alignment with the optical axis 71' of the auxiliary lens 47' within very close tolerances, whilst the boundary surface 77' of the objective lens 45' is moved to a position a desired distance apart from the auxiliary lens 47' within very close tolerances. This obviates the need for further alignment of the objective lens 45' with respect to the auxiliary lens 47' by means of aligning tools, which leads to a significant further simplification of the manufacturing process of the lens system 39'. Similarly as the lens body 75 of the objective lens 45 as discussed above, the glass lens body 75' of the objective lens 45' is more than hemispherical, in spite of the fact that the objective lens 45', unlike the objective lens 45, need not be tilted after being placed in the lens mount 69'. As a result, the maximum sphere diameter of the lens body 75' formed by providing the boundary surface 77' on an originally fully spherical lens body exactly equals the very accurate diameter of the original lens body, which is made by means of the aforesaid rolling process, as a result of which a very accurate fit of the objective lens 45' in the lens mount 69' is obtained. It is noted that the invention also comprises embodiments in which a different kind of positioning surface extending perpendicularly to the center line 73' for the objective lens 45' is used instead of the annular positioning surface 97. The positioning surface 97 may comprise, for example, two or three ring segments, or three relatively small supporting surfaces.

As FIGS. 4*a* and 4*b* further show, the annular positioning surface 97 adjoins the lens mount 69' via an annular recess or groove 99 formed in the positioning surface 97. During assembly of the objective lens 45' in the lens mount 69', the outer circumference of the lens body 75' is slid over the surface of the lens mount 69', since there is hardly any clearance between the lens mount 69' and the lens body 75'. As a result, dust particles present on the lens mount 69' are loosened and, as a result of the frictional forces that occur, small particles are even detached from the lens mount 69'. As the recess 99 is positioned directly under the surface of the lens mount 69', i.e. where the lens body 75' slides over the surface of the lens mount 69' during assembly, substantially all the aforesaid dust particles and particles of the lens mount 69' will be collected in said recess 99. After the objective lens 45' has been placed into abutment with the positioning surface 97, the recess 99 is closed by the boundary surface 77' of the objective lens 45', so that the aforesaid particles will be confined in the recess 99. Similarly as the lens system 39, the lens system 39' includes an air vent connection, which places the chamber 85' into communication with the environment of the lens system 39'. The air vent connection of the lens system 39' comprises a groove-like channel 101 formed in the surface of the lens mount 69', which extends from the upper edge 95' of the lens mount 69' substantially parallel to the center line 73' and opens into the recess 99, as well as a groove-like channel 103 formed in the positioning surface 97, which extends from the chamber 85' substantially perpendicularly to the center line 73' and likewise opens into the recess 99. The two channels 101 and 103 are likewise formed in the integrated part 63' during the moulding process in that the mould to be used in the moulding process is provided with corresponding elevated linear parts. As FIG. 4*a* shows, the lens system 39' is furthermore provided with a protective element 105 which also forms part of the integrated part 63', which element is arranged near the bottom side and near the boundary surface 65' of the auxiliary lens 47'. In the illustrated embodiment, the protective element 105 comprises an annular threshold 107 which, viewed in a direction parallel to the optical axis 71' of the auxiliary lens 47', extends beyond the auxiliary lens 47', i.e. below the bottom side and the boundary surface 65' of the auxiliary lens 47', viewed in FIG. 4*a*. The protective element 105 functions as a bumper which, in operation, protects the auxiliary lens 47' against damage that might be caused by mechanical contact between the auxiliary lens 47' and the record carrier 9 resulting from, for example, impact loads on the lens system 39'. The protective element 105 is likewise provided in the integrated part 63' in a simple manner during the moulding process in that the mould to be used during the moulding process is provided with a mould portion corresponding to the threshold 107, which is recessed in the mould portion that corresponds to the bottom side and the boundary surface 65' of the auxiliary lens 47'.

Another advantage of the lens systems 39 and 39' as discussed above is the fact that the lens systems 39 and 39' have a relatively low mass, due to the use of the auxiliary lenses 47, 47' of a synthetic material and the lens holders 61, 61' of a synthetic material. This leads to a significant reduction of the driving forces required for moving the lens systems 39, 39', as a result of which the scanning speeds of the scanning device 15 can be considerably increased. This advantage is embodied to an enhanced extent in the third embodiment of a lens system 39" according to the invention as schematically shown in FIG. 5, which uses an objective lens 109 which is likewise made of a transparent synthetic material. In FIG. 5, parts of the lens system 39" that correspond to parts of the lens systems 39 and 39' as discussed hereinbefore are denoted by corresponding reference numerals; hereinafter only the essential differences between the lens system 39" and the lens systems 39, 39' will be discussed. As FIG. 5 shows, the integrated part 63" includes a lens mount 111 for the objective lens 109 having the shape of a segment of a sphere. A center M' of the lens mount 111 is positioned on the optical axis 71" of the auxiliary lens 47" within very close tolerances. The lens mount 111 is provided in the integrated part 63" during the moulding process by providing the mould to be used in the moulding process with a corresponding mould surface having the shape of a segment of a sphere. The lens mount 111 is thus formed in the integrated part 63" in a simple and very accurate manner, as a result of which in particular the tolerances within which the aforesaid center M' lies on the optical axis 71" are very small. The objective lens 109 includes a lens body comprising an optically effective first part 113 having the shape of a segment of a sphere and an optically effective second part 15 having the shape of a segment of a sphere, which has a radius $r_B$ that substantially equals the radius of the lens mount 111 having the shape of a segment of a sphere. The two parts 113 and 115 of the lens body are each less than hemispherical to a significant extent, so that the two parts 113 and 115 of the lens body can easily be removed from the mould parts used in the moulding process after their manufacture by means of a moulding process. The radius of the lens mount 111 and the radius $r_B$ of the second part 115 of the lens body can be made to be identical to each other within very close tolerances by means of the two moulding processes. Moreover, as the center M' of the lens mount 111 lies on the optical axis 71" within very close tolerances, the objective lens 109 is positioned in directions perpendicular and parallel to the optical axis 71" relative to the auxiliary lens 47" in a very accurate manner by placing the second part 115 of the lens body in the lens mount 111. After being placed in the lens mount 111, the objective lens 109 can still be tilted through limited angles about the center M' in the lens mount 111 for the purpose of aligning the optical axis 117 of the objective lens 109 with the optical axis 71" of the auxiliary lens 47". The position of the objective lens 109 is not affected in directions perpendicular and parallel to the optical axis 71" by the tilting movement of the objective lens 109, so that said position is maintained in a accurate manner. The alignment of the optical axes 117 and 71" is carried out by means of an aligning tool for manipulating the objective lens 109 and by means of optical measuring equipment, by means of which the orientation of an optical boundary surface 119 of the objective lens 109 facing the auxiliary lens 47" is measured during said manipulation via the transparent window 83' surrounding the auxiliary lens 47". The chamber 85" enclosed by the lens holder 61", the auxiliary lens 47" and the objective lens 109 is in communication with the environment of the lens system 39" via an air vent connection, which air vent connection comprises a curved, groove-like channel 121 extending from the chamber 85" to the upper edge 95" of the lens mount 111. The channel 121 is formed in the integrated part 63" during the moulding process by providing the mould used in the moulding process with a linear elevation on the mould surface corresponding to the lens mount 111.

The optical player according to the invention as described in the foregoing makes it possible to read information present on the information layer 13 of the record carrier 9 from said information layer 13 or write information onto said information layer 13 when said information layer 13 is being scanned. It is noted that the invention also relates to optical players which can only read information present on an information layer of a record carrier or only write information onto the information layer 13.

What is claimed is:

1. An optical lens system for use in an optical scanning device for scanning an optically scannable record carrier, which lens system comprises a first lens, a second lens, which is relatively small in comparison with the first lens and, in operation, is positioned between the first lens and the record carrier, and a lens holder accommodating the two lenses, characterized in that the lens holder and one of the two lenses are manufactured as one single integrated part from a transparent synthetic material by means of a moulding process, whilst the other lens is arranged in the integrated part as a separate component, with a chamber enclosed by the two lenses and the lens holder communicating with the environment of the lens system via an air vent connection.

2. An optical lens system as claimed in claim 1, characterized in that the integrated part comprises the lens holder and the second lens.

3. An optical lens system as claimed in claim 1, characterized in that the integrated part is provided with a circular cylindrical lens mount for the other lens, which lens mount has a center line which substantially coincides with an optical axis of the lens that forms part of the integrated part, whilst the other lens makes up more than one half of a substantially spherical lens body of glass with a diameter which is substantially equal to a diameter of the lens mount.

4. An optical lens system as claimed in claim 3, characterized in that the integrated part is provided with a positioning surface for the other lens, which extends substantially perpendicularly to the center line and bounds the lens mount, whilst the spherical lens body of the other lens is provided with a boundary surface on a side facing the lens that forms part of the integrated part, via which boundary surface the other lens abuts against the positioning surface.

5. An optical lens system as claimed in claim 4, characterized in that the positioning surface adjoins the lens mount via a recess formed in the positioning surface.

6. An optical lens system as claimed in claim 5, characterized in that the air vent connection comprises at least one groove-like channel formed in a surface of the lens mount and at least one groove-like channel formed in the positioning surface, which channels both open into the recess.

7. An optical lens system as claimed in claim 3, characterized in that the air vent connection comprises at least one groove-like channel formed in a surface of the lens mount.

8. An optical lens system as claimed in claim 1, characterized in that the integrated part is provided with a lens mount for the other lens having the shape of a segment of a sphere, which lens mount has a center which lies on an optical axis of the lens that forms part of the integrated part, whilst the other lens comprises a lens body substantially having the shape of a segment of a sphere, which has a radius which is substantially equal to a radius of the lens mount.

9. An optical lens system as claimed in claim 1, characterized in that the integrated part is provided, near the lens that forms part of the integrated part, with a transparent window extending substantially perpendicularly to an optical axis of said lens, via which window the enclosed chamber is optically accessible from the environment of the lens system.

10. An optical lens system as claimed in claim 1, characterized in that the integrated part is provided, near the lens that forms part of the integrated part, with a protective element which extends beyond the aforesaid lens, parallel to an optical axis of said lens.

11. An optical lens system as claimed in claim 1, characterized in that the lens that forms part of the integrated part is provided with a substantially circular optical boundary surface extending substantially perpendicularly to an optical axis of said lens, a center of which optical boundary surface is spaced apart from the optical axis by a distance which is larger than the radius of a radiation beam which, in operation, is present in the optical boundary surface.

12. An optical scanning device for scanning an optically scannable record carrier, which scanning device comprises a radiation source, an optical lens system having an optical axis for focusing a radiation beam supplied, in operation, by the radiation source to a scanning spot on the record carrier, and an actuator for displacing the lens system parallel to the optical axis, the lens system comprising a first lens, a second lens, which is relatively small in comparison with the first lens and, in operation, is positioned between the first lens and the record carrier, and a lens holder accommodating the two lenses, characterized in that said lens system is a lens system as claimed in claim 1.

13. An optical player comprising a table which is rotatable about an axis of rotation, a displacement device and an optical scanning device for scanning an optically scannable record carrier which can be placed on the table, the scanning device comprising a radiation source, an optical lens system having an optical axis for focusing a radiation beam supplied, in operation, by the radiation source to a scanning spot on the record carrier, and an actuator for displacing the lens system parallel to the optical axis, the lens system comprising a first lens, a second lens, which is relatively small in comparison with the first lens and, in operation, is positioned between the first lens and the record carrier, and a lens holder accommodating the two lenses, at least the lens system of the scanning device being displaceable by means of the displacement device substantially in a radial direction relative to the axis of rotation, characterized in that said optical scanning device is an optical scanning device as claimed in claim 12.

* * * * *